United States Patent
Bicheler et al.

(10) Patent No.: US 6,396,171 B1
(45) Date of Patent: May 28, 2002

(54) CIRCUIT FOR STABILIZING A HIGH VOLTAGE

(75) Inventors: Hans-Günter Bicheler, Villingen-Schwenningen; Gerard Rilly, Unterkirnach, both of (DE)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 09/526,871

(22) Filed: Mar. 16, 2000

(30) Foreign Application Priority Data

Mar. 20, 1999 (DE) .......................... 199 12 627

(51) Int. Cl.$^7$ .......................... H01H 35/00; H01F 27/30
(52) U.S. Cl. .......................... 307/121; 336/208
(58) Field of Search .......................... 307/121; 315/411; 336/208, 206, 181, 185; 363/20, 97, 21.01

(56) References Cited

U.S. PATENT DOCUMENTS

| | | | | |
|---|---|---|---|---|
| 4,531,181 A | * | 7/1985 | Herz et al. | 363/21.1 |
| 4,727,464 A | * | 2/1988 | Hartmann et al. | 315/411 |
| 4,814,672 A | * | 3/1989 | Dieterle et al. | 315/411 |
| 4,912,617 A | * | 3/1990 | Hartmann et al. | 363/67 |
| 5,049,792 A | * | 9/1991 | Oh | 315/411 |
| 5,656,890 A | * | 8/1997 | Park | 315/411 |

FOREIGN PATENT DOCUMENTS

| | | | | |
|---|---|---|---|---|
| DE | 2620191 | 11/1977 | | H04N/3/18 |
| DE | 3931372 | 9/1989 | | H04N/3/185 |
| DE | 19529447 | 8/1995 | | C09G/1/04 |
| EP | 0243738 | 11/1987 | | |
| EP | 0414184 | 2/1991 | | H04N/3/185 |
| EP | 0469821 A2 | 2/1992 | | |
| EP | 0582151 | 2/1994 | | H04N/3/185 |

OTHER PUBLICATIONS

Patent Abstracts of Japan vol. 1997, No. 12, Dec. 25, 1997 & JP 09 214799 A (Victor Co. of Japan Ltd.) Aug. 15, 1997.
"Dynamic Load Correction for EHT Voltage Regulation" IBM Technica Disclosure Bulletin, vol. 29, No. 12, May 1987 pp. 5439–5440 XP002140813 us *p. 5439, line 17–line 21.
*English language abstract provided for each reference.
Copy of Search Report.

* cited by examiner

*Primary Examiner*—Rajnikant B. Patel
(74) *Attorney, Agent, or Firm*—Joseph S. Tripoli; Harvey D. Fried; Sammy S. Henig

(57) ABSTRACT

The circuit for stabilizing a high voltage for a picture tube comprises a high-voltage transformer, which has a primary winding and a high-voltage winding, a switch, which is connected in series with the primary winding, and a control loop for high-voltage stabilization. The control voltage of the control loop, with which the switch is driven, is derived from two signals in this case. The first signal is tapped off from a secondary auxiliary winding at the transformer and supplies a static control voltage component, and the second signal is derived directly from the high voltage and supplies a measure of the dynamic loading on the high-voltage generator. The static control voltage component is, in particular, a measure of the value of the high voltage during the vertical line flyback, when the screen is black and the high-voltage transformer is minimally loaded. In this case, the auxiliary winding supplies a voltage which is proportional to the secondary flyback pulse. The second signal is a fast control signal, since it is derived directly from the high voltage.

10 Claims, 2 Drawing Sheets

CIRCUIT FOR STABILIZING A HIGH VOLTAGE

BACKGROUND OF THE INVENTION

The invention relates to a circuit for stabilizing a high voltage for a picture tube having a high-voltage transformer, which has a primary winding and, on the secondary side, a high-voltage winding, having a switch, which is connected in series with the primary winding, and having a control loop for high-voltage stabilization. Circuits of this type are used for example in television sets or computer monitors for the purpose of generating a stable high voltage.

EP 0 582 599 B1 discloses a circuit of this type which has a control loop between the high voltage on the output side and the emitter of the switching transistor. In this case, a control signal is tapped off from the high voltage by means of a resistive voltage divider and fed to a pulse width modulator. The latter uses the pulse-width-modulated signal to drive a transistor via which the emitter of the switching transistor is connected to a negative voltage, an inductance being connected between the emitter and the transistor. A capacitor with respect to which the switching transistor operates is connected between the emitter of the switching transistor and earth. The base of the switching transistor is driven, via a transformer, with a voltage which is line-synchronized and turns the switching transistor on during a line flyback.

DE-A 39 31 372, EP 0 592 151 B1, EP 0 483 432 B1 and EP-A 0 414 184 disclose further circuits for stabilizing a high voltage.

The object of the present invention is to specify a circuit for generating a stable high voltage for a picture tube which operates in a wide load range.

SUMMARY OF THE INVENTION

The circuit for stabilizing a high voltage for a picture tube comprises a high-voltage transformer, which has a primary winding and a high-voltage winding, a switch, which is connected in series with the primary winding, and a control loop for high-voltage stabilization. The control voltage of the control loop, with which the switch is driven, is derived from two signals in this case. The first signal is tapped off from a secondary auxiliary winding at the transformer and supplies a static control voltage component, and the second signal is derived directly from the high voltage and supplies a measure of the dynamic loading on the high-voltage generator.

The static control voltage component is, in particular, a measure of the value of the high voltage during the vertical field flyback, when the screen is black and the high-voltage transformer is therefore minimally loaded. In this case, the auxiliary winding supplies a voltage which is proportional to the secondary flyback pulse. The second signal is a fast control signal, since it is derived directly from the high voltage. This signal can advantageously be derived from the high voltage via a capacitive voltage divider, one capacitance being the aquadag capacitor that is present in any case in the picture tube, and the second capacitance being a low-voltage capacitor.

The first signal is detected by means of a time window during the line flyback and subsequently passed to a peak value rectifier, followed by an impedance converter. The output voltage of the latter is integrated and sampled synchronously with the vertical flyback pulse by a sample & hold circuit.

The output signal of the capacitive voltage divider is passed to a limiting network with an impedance converter and is reset by means of a switching logic unit after each frame or field by a reset switch which is synchronized with the vertical flyback pulse. The switching logic unit simultaneously controls the sample & hold circuit of the first signal. The output signals of the sample & hold circuit and of the reset circuit are passed to a difference-forming means, for example a differential amplifier, which generates the difference between the two signals and, as a result of this, the control signal for the switch.

The circuit has the advantage that, for the control, firstly a signal is used which is influenced very little by the load or loading (first signal via secondary auxiliary winding) and a second signal which follows the high-voltage loading in the microseconds range. At the same time, cost-effective standard components can be used for realizing the circuit. In particular, the controlling circuit does not require an expensive high-voltage divider block.

The stabilization circuit can be used in particular in high-voltage generators which provide high average picture powers, for example up to 100 watts for 36" picture tubes, and are designed separately from the deflection circuit. For large picture tubes this enables a high picture brightness and a high picture contrast in conjunction with an improved picture geometry. It can be used in particular at relatively high deflection frequencies in the range of 30–50 kHz. Synchronization with the deflection frequency is optional in this case.

BRIEF DESCRIPTION OF THE DRAWINGS

The invention is explained in more detail below by way of example with reference to schematic drawings, in which.

DESCRIPTION OF THE PREFERRED EMBODIMENT

Figure 1:
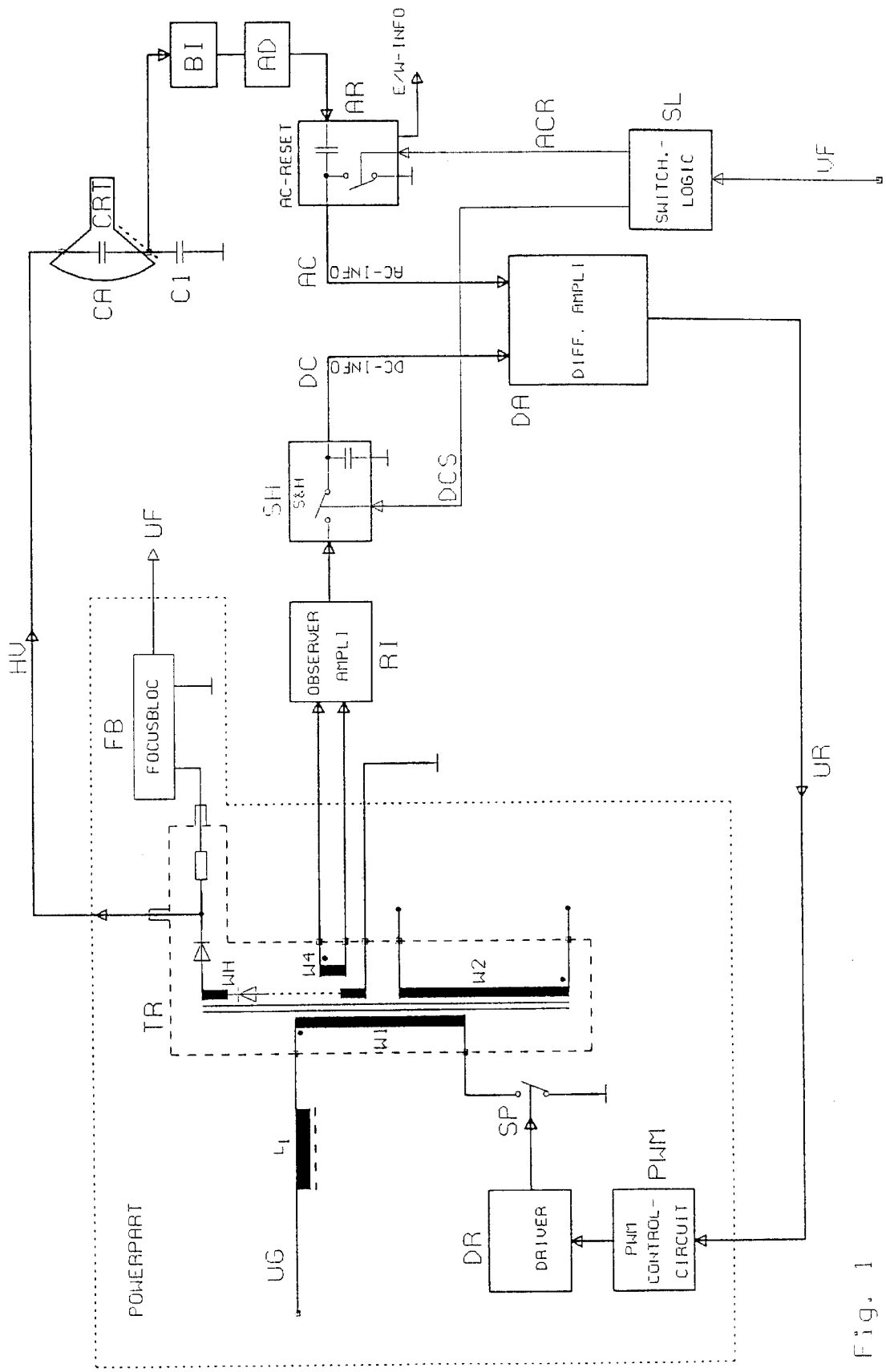
FIG. 1 shows a block diagram with a circuit for stabilizing a high voltage.

FIG. 1 illustrates a high-voltage transformer TR with a primary winding W1 and windings arranged on the secondary side, namely a high-voltage winding WH and an auxiliary winding W4. A DC voltage, for example of 300 V, is applied to the primary winding W1 and a switch SP is connected in series therewith for the purpose of generating the output voltages. Voltages which are proportional to the flyback pulse are present across the windings WH and W4 on the secondary side. The high-voltage WH is, in particular, a winding according to the diode-split principle. Switching transistors or MOSFETs can be used as the switch SP, as are customary in high-voltage generators of television sets or monitors. The high-voltage transformer TR usually also contains further windings (W2), for example for generating supply voltages.

The high voltage HV generated by the high-voltage winding WH is applied firstly to a picture tube CRT and can additionally be used for a focus voltage UF, which is derived from the high voltage HV by means of a focus block FB. The high voltage HV is usually smoothed by means of capacitances, for which purpose, in particular, an aquadag capacitance CA of the picture tube CRT is used. This is formed by an inner and an outer coating around the rear glass sheath of the picture tube CRT, the inner coating being connected to the high voltage and also to the anode of the picture tube. The outer coating, which is usually connected to earth, is in this case connected to a capacitor C1 in order to form a voltage divider. A fast control signal which is proportional to the high voltage HV can therefore be derived via the centre tap of the capacitive voltage divider.

The voltage tapped off at the capacitive voltage divider is applied to a limiting network with an impedance converter BI, with the result that a low-voltage capacitor, for example having a maximum voltage loading of 300 V, can be used for the capacitor C1. By way of example, a zener diode or a varactor diode can be used as the limiter. The limiting network BI is followed by an inverting adder with an adjustable output value AD and then by a reset circuit AR, which is driven by a switching logic unit SL.

The auxiliary winding W4 supplies a voltage which is proportional to the secondary flyback pulse, is subsequently conditioned by a peak value rectifier and integrator RI and is fed to a sample & hold circuit SH. By means of this sample & hold circuit SH, the signal of the auxiliary winding W4 is sampled synchronously with the vertical flyback pulse VF applied to the switching logic unit SL.

As a result of this, a signal which supplies a static control voltage component and corresponds to the value of the non-loaded high voltage HV is tapped off through the auxiliary winding W4. The signal supplied by the capacitive voltage divider C1, C2 supplies a measure of the dynamic loading on the high-voltage transformer TR and supplies a fast item of control information for controlling the high voltage. The two signals are subsequently passed to a differential amplifier DA, whose output voltage forms the control voltage UR. The signal AC can simultaneously be used for east-west correction of the picture. The control of the switching logic unit SL is explained below with reference to FIG. 3.

The control voltage UR may be utilized for example by a control circuit PWM, which generates a pulse-width-modulated signal with which the switch SP is driven via a driver stage DR. The pulse-width-modulated signal may, for example, be generated by an oscillator which generates a sawtooth signal by means of a sawtooth generator. The said sawtooth signal and the control voltage UR are passed to a comparator, as a result of which a pulse-width-modulated signal is produced as a function of the control voltage UR. The oscillator may be synchronized with the horizontal deflection signal, but this is not necessary.

The assemblies illustrated in FIG. 1 are only by way of example, in order to illustrate the function of the circuit. The individual assemblies may also be grouped differently or be combined in an integrated circuit.

Figure 2:
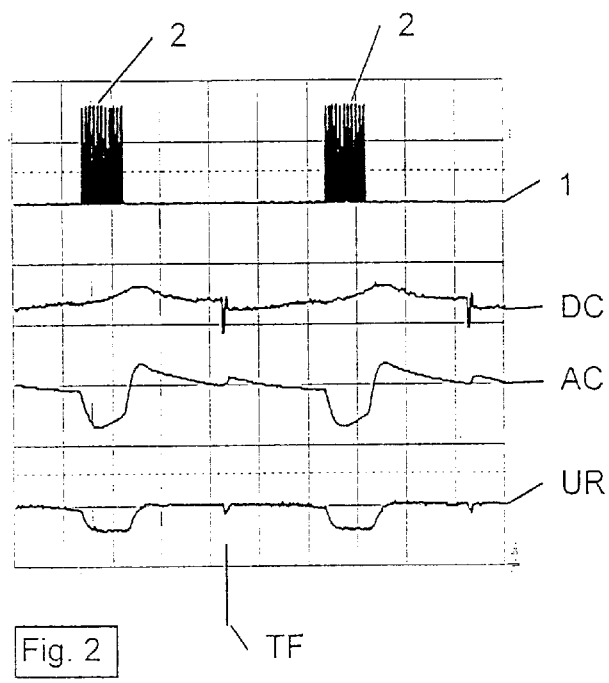
FIG. 2 shows the control voltage and the two signals for a video signal with a horizontal white bar.

FIG. 2 illustrates the profile of the control voltage UR for a video signal with a horizontal white bar 2 together with the two-signals DC and AC. These are illustrated as oscillograms with a time base of 2 msec per unit. In this case, the white bar has a size of 50% horizontally and 20% vertically of the picture. In this case, the white bar 2 of the video signal 1 has a vertical, temporal width of just below 2 msec; the resolution of the individual picture lines can still be discerned. The signal DC rises somewhat due to the white bar 2, but is influenced relatively little it. The signal AC, on the other hand, exhibits a major excursion corresponding approximately to the white bar 2. The control voltage UR formed from the difference between the two signals DC and AC thereby produces approximately a rectangular-waveform pulse in accordance with the vertical width of the white bar 2.

Figure 3:
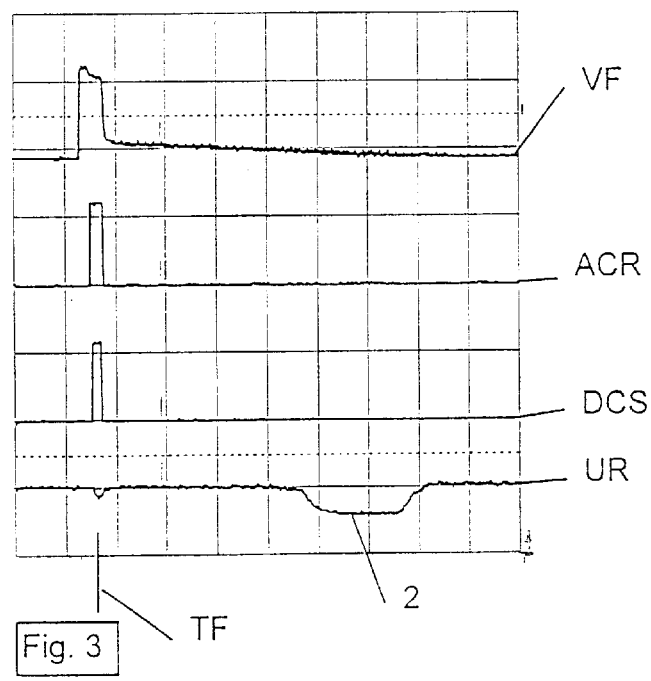
FIG. 3 shows control pulses for determining the first signal.

FIG. 3 illustrates the time response for the individual signals. The time base is 1 msec per unit in this case. As described above, the acquisition pulse (set pulse) DCS for the sample & hold circuit SH lies within the vertical flyback pulse VF. The reset pulse ACR for the reset circuit AR takes place simultaneously with the reset pulse DCS. The width and the timing of these two signals can be adjusted by means of the switching logic unit SL. For comparison with this, the control voltage UR is illustrated as the bottom most curve in FIG. 3. The vertical flyback time range TF can likewise clearly be discerned in the case of the signals DC and AC, FIG. 2.

What is claimed is:

1. A circuit for stabilizing a high voltage for a picture tube comprising:

a high-voltage transformer having a primary winding, a high-voltage winding, and a secondary auxiliary winding;

a switch connected in series with the primary winding, a control loop for high-voltage stabilization, which provides a control voltage for driving the switch, the control voltage being derived from two signals,
   the first signal being tapped off from the secondary auxiliary winding within a time window set during vertical field flyback for providing a static control voltage reference, and
   the second signal being derived from the high voltage of the high-voltage winding aid providing a measure of dynamic loading on the high-voltage transformer, and a difference-forming means, which generates the control voltage from a difference between the first and second signals.

2. The circuit according to claim 1, further comprising a switching logic unit, by means of which the time window during the vertical field flyback is obtained.

3. The circuit according to claim 2, further comprising a peak value rectifier, an integrator and a sample-and-hold circuit which are connected between the auxiliary winding and the switching logic unit.

4. The circuit according to claim 1, further comprising a capacitive voltage divider for deriving the second signal from the high voltage.

5. The circuit according to claim 4, wherein one of the capacitances of the voltage divider is an aquadag capacitance of the picture tube.

6. The circuit according to claim 4, further comprising a limiting network with an impedance converter and an inverting adder with an adjustable output value connected downstream of the capacitive voltage divider.

7. The circuit according to claim 2, wherein the second signal is reset after each field by means of the switching logic unit and a reset circuit.

8. The circuit according to claim 7, wherein the second signal is used simultaneously for east-west correction of the picture.

9. The circuit according to claim 1, further comprising:

a pulse width modulated control circuit with an oscillator, from the output signal of which a sawtooth signal is generated by means of a sawtooth generator and is passed together with the control signal to a comparator, for the generation of a pulse-width-modulated square-wave signal which serves for driving the switch.

10. A circuit for stabilizing a high voltage for a picture tube comprising:
- a high-voltage transformer having a primary winding, a high-voltage winding and a secondary auxiliary winding;
- a switch, which is connected in series with the primary winding;
- a control loop for stabilization of the high-voltage, the control loop providing a control voltage for driving the switch, the control voltage being derived from two signals,
  - the first signal being tapped off from the secondary auxiliary winding and
  - the second signal being derived from the high voltage and supplying a measure of dynamic loading on the high-voltage transformer; and
- a switching logic unit for generating a time window during vertical field flyback, by means of which the fit signal is obtained from the secondary auxiliary winding for providing a static control voltage component.

* * * * *